United States Patent
Nilsson et al.

(10) Patent No.: US 9,802,565 B2
(45) Date of Patent: Oct. 31, 2017

(54) SAFETY SYSTEM AND METHOD FOR OPERATING A SAFETY SYSTEM OF A VEHICLE

(71) Applicant: VOLVO CAR CORPORATION, Gothenburg (SE)

(72) Inventors: Par Nilsson, Gothenburg (SE); Stefan Jarvholm, Halta (SE); Peter Harda, Torslanda (SE); Bjorn Johansson, Alingsas (SE); Anders Dahlen, Ytterby (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/559,468

(22) Filed: Dec. 3, 2014

(65) Prior Publication Data
US 2015/0165997 A1  Jun. 18, 2015

(30) Foreign Application Priority Data
Dec. 12, 2013 (EP) ..................................... 13196957

(51) Int. Cl.
*B60R 21/0134* (2006.01)
*B60R 21/0132* (2006.01)

(52) U.S. Cl.
CPC *B60R 21/0134* (2013.01); *B60R 2021/01322* (2013.01)

(58) Field of Classification Search
CPC ...... B60R 21/0134; B60R 2021/01322; B60R 21/013
USPC .......................................................... 701/45
See application file for complete search history.

(56) References Cited

U.S. PATENT DOCUMENTS

| 5,428,534 A * | 6/1995 | Wetzel | B60R 21/0136 180/274 |
| 5,498,028 A * | 3/1996 | Carlin | B60R 21/0132 280/735 |
| 5,835,007 A * | 11/1998 | Kosiak | B60R 21/013 340/436 |

(Continued)

FOREIGN PATENT DOCUMENTS

| CN | 203005340 U | 6/2013 | |
| DE | 4429419 A1 * | 2/1996 | ............. B60T 8/172 |

(Continued)

OTHER PUBLICATIONS

EPO machine translation of DE 102008034634 A1 (original German document published Dec. 24, 2009).*

(Continued)

*Primary Examiner* — Behrang Badii
*Assistant Examiner* — David Testardi
(74) *Attorney, Agent, or Firm* — Brooks Kushman P.C.

(57) ABSTRACT

The present disclosure relates to a method for operating a safety system of a vehicle, which safety system comprises a remote sensor, an impact sensor and a protection system adapted to be activated by the impact sensor. The method includes scanning a selectable region in front of the vehicle by means of the remote sensor, determining that the selectable region provides a free path for the vehicle based on information from the remote sensor, and lowering a sensitivity of the impact sensor. The disclosure further relates to the safety system and a vehicle comprising the safety system.

19 Claims, 3 Drawing Sheets

(56) References Cited

U.S. PATENT DOCUMENTS

| | | | |
|---|---|---|---|
| 6,031,484 A * | 2/2000 | Bullinger | B60R 21/013 340/436 |
| 6,271,747 B1 * | 8/2001 | Fendt | B60R 21/013 307/10.1 |
| 6,295,495 B1 * | 9/2001 | Morman | B60R 21/013 340/903 |
| 7,616,101 B2 * | 11/2009 | Kuttenberger | G01S 13/931 180/167 |
| 7,636,625 B2 | 12/2009 | Weber et al. | |
| 7,671,723 B2 | 3/2010 | Theisen | |
| 8,577,552 B1 * | 11/2013 | Smit | G01S 13/931 701/41 |
| 8,825,305 B2 | 9/2014 | Itoga | |
| 2003/0100983 A1 * | 5/2003 | Bullinger | B60R 21/013 701/45 |
| 2005/0125126 A1 | 6/2005 | Yopp | |
| 2006/0195231 A1 | 8/2006 | Diebold et al. | |
| 2007/0114767 A1 * | 5/2007 | Miyata | B60R 21/0132 280/735 |
| 2007/0162231 A1 | 7/2007 | Schlogl | |
| 2008/0266167 A1 * | 10/2008 | Baumann | G01S 13/87 342/52 |
| 2009/0055051 A1 | 2/2009 | Chu | |
| 2009/0143987 A1 | 6/2009 | Bect et al. | |
| 2009/0299578 A1 * | 12/2009 | Lucas | B60R 21/013 701/46 |
| 2010/0063676 A1 | 3/2010 | Ito | |
| 2011/0184617 A1 | 7/2011 | Hegemann et al. | |
| 2013/0124052 A1 | 5/2013 | Hahne | |
| 2014/0000974 A1 * | 1/2014 | Nilsson | B60R 21/015 180/274 |

FOREIGN PATENT DOCUMENTS

| | | | | |
|---|---|---|---|---|
| DE | 19729960 A1 * | 11/1998 | | B60R 21/013 |
| DE | 19938891 A1 | 2/2001 | | |
| DE | 10349210 A1 * | 5/2005 | | B60R 21/013 |
| DE | 102004054072 A1 | 5/2006 | | |
| DE | 102007032742 A1 | 1/2009 | | |
| DE | 102008034634 A1 * | 12/2009 | | B60R 21/0134 |
| DE | 102010009216 A1 * | 8/2011 | | B60R 21/013 |
| DE | 102011118149 A1 | 5/2013 | | |
| EP | 0728624 A2 | 8/1996 | | |
| EP | 1344696 A1 | 9/2003 | | |
| EP | 1747945 A1 * | 1/2007 | | B60R 21/0132 |
| EP | 2679450 A1 | 1/2014 | | |
| FR | 2765168 A1 * | 12/1998 | | B60R 21/013 |
| FR | 2889882 A1 | 2/2007 | | |
| GB | 2400353 A | 10/2004 | | |
| JP | 2003095058 A * | 4/2003 | | |
| JP | 2005126006 A * | 5/2005 | | B60R 21/013 |
| WO | WO 9815435 A1 * | 4/1998 | | B60R 21/013 |
| WO | 2005012045 A1 | 2/2005 | | |
| WO | 2009141092 A1 | 11/2009 | | |

OTHER PUBLICATIONS

JPO machine translation of JP 2003-95058 (originial JP document published Apr. 3, 2003).*
EPO machine translation of DE 102008034634 (original DE document published Dec. 24, 2009).*
EPO machine translation of DE 4429419 (original DE document published Feb. 22, 1996).*
Extended European Search Report dated Dec. 6, 2012, Application No. 12173739.9-1523, Applicant Volvo Car Corporation, (Reference P1729EP00), 6 Pages.
Extended European Search Report dated Apr. 29, 2014, Application No. 13196959.4-1503 Applicant Volvo Car Corporation, (Reference P1876EP00), 5 Pages.
Extended European Search Report dated May 14, 2014, Application No. 13196957.8-1503, Applicant Volvo Car Corporation (Reference P1888EP00), 4 Pages.
European Third Party Observation Dated Jun. 15, 2015, Application No. 12173739.9-1503 / 2679450—Applicant Volvo Car Corporation, 3 Pages.

* cited by examiner

SAFETY SYSTEM AND METHOD FOR OPERATING A SAFETY SYSTEM OF A VEHICLE

CROSS-REFERENCE TO RELATED APPLICATIONS

This application claims foreign priority benefits under 35 U.S.C. §119(a)-(d) to European patent application number EP 13196957.8, filed Dec. 12, 2013, which is incorporated by reference in its entirety.

TECHNICAL FIELD

The present disclosure relates to a method for operating a safety system of a vehicle, which safety system comprises a remote sensor, an impact sensor and a protection system, wherein the protection system is adapted to be activated by the impact sensor. The disclosure further relates to the safety system and a vehicle comprising the safety system.

BACKGROUND

A modern vehicle may be equipped with different protection means for mitigating the consequences of a collision. The protection means may be preventive, i.e., intended to be activated before the collision, and/or they may be protective, i.e., intended to be activated during the collision. The protection means may be external to the vehicle, e.g., being activated on the outside of the vehicle in case of a collision with a vulnerable road user in order to protect the vulnerable road user, such as a pedestrian airbag or a deployable bonnet. The protection means may be internal, i.e., used within the vehicle, e.g., intended to protect a user of the vehicle, such as a driver or a passenger.

The protection means may further be characterized as reversible or irreversible. If reversible, the protection means may be used again. If irreversible, the protection means is to be reset or replaced to be ready for use again. This may lead to costly repairs and/or vehicle user dissatisfaction. Further, there may be a maximum number of activations for a reversible protection means and/or it may cost some time and effort to reset it. There is therefore a desire to avoid activating a protection means, if it will not help to mitigate the consequence of the collision.

U.S. Pat. No. 7,636,625 B2 discloses a device for classifying at least one object with the aid of an environmental sensor system. The device classifies the at least one object on the basis of its velocity and acceleration, the device determining the velocity and the acceleration from a signal of the environmental sensor system. The device is adapted to be coupled to a restraint system and is capable of controlling the restraint system as a function of the classification. The device classifies the object as a vehicle object or a pedestrian object.

SUMMARY

An object of the present disclosure is to overcome or ameliorate at least one of the disadvantages of the prior art, or to provide a useful alternative.

It is desirable to provide a system being adapted to activate a protection means, if it will help, and not activate it, if it will not help.

Thus, in a first aspect of the present disclosure there is provided a method for operating a safety system of a vehicle, which safety system comprises a remote sensor, an impact sensor and a protection system, which is adapted to be activated by the impact sensor.

The method comprises:
 scanning a selectable region in front of the vehicle by means of the remote sensor,
 determining that the selectable region provides a free path for the vehicle based on information from the remote sensor, and
 lowering a sensitivity of the impact sensor.

The vehicle may be a car, bus, truck or lorry, for example. The vehicle may be adapted to be utilized on a public road network.

The remote sensor may comprise a radar system, a lidar system, an ultrasonic system, a camera system, a stereo camera system and/or an IR camera system, for example.

The impact sensor is adapted to activate the protection system, when the impact sensor detects an impact and/or an imminent impact. It may comprise one or more accelerometers at different locations in the vehicle, a pressure sensor, a light sensor, a fiber-optic sensor, a contact foil and/or a piezoelectric sensor, for example. The impact sensor is adapted to detect an object being in contact with and/or in a close proximity of the impact sensor. There may be a plurality of impact sensors at different locations in the vehicle.

The protection system may be preventive and/or protective. It comprises one or more protection means. The protection system may be a supplementary restraint system. The method described herein may be very useful for a supplementary restraint system. A supplementary restraint system comprises sensors and protection means for an internal protection for users of the vehicle. Examples of such sensors are accelerometers at different locations in the vehicle, pressure sensors, speed sensors for relative speed, belt lock sensors, seat position sensors and/or a sensor for automatic shutting-off of a passenger airbag. Examples of such protection means are a reversible belt-tensioner, an irreversible belt tensioner, an adaptive force limitation means, a driver airbag, a passenger airbag, an adaptive steering column, a side airbag, an inflatable curtain and/or a knee airbag.

The sensitivity of the impact sensor is lowered, since it is desirable to provide a method being adapted to avoid activating a protection means, if it will not help to mitigate the consequence of a collision. Thereby, repair and replacement of a protection means and/or stand-still of the vehicle may be avoided, things that may lead to vehicle user dissatisfaction.

The sensitivity of the impact sensor is temporarily lowered, such that the lower sensitivity may be utilized within the region, wherein it has been determined that a free path is provided. The sensitivity of the impact sensor is the minimum magnitude of input signal to produce a specified output signal, in this case resulting in an activation of the protection system.

If more than one protection means is used, and especially if they are of different kinds, there may be different sensitivities for the different sensors being adapted to activate the different protection means, which sensitivities are adjusted individually for each sensor. The individual sensitivity may for example be selected dependent on how expensive and/or difficult it would be to repair/replace that protection means, while considering if the protection means would contribute to an adequate protection.

The region in front of the vehicle may be preselected or may be selectable by the user or by a control system of the vehicle. The size and/or shape of the region may be selected considering factors such as a speed of the vehicle hosting the safety system, capability of the vehicle, e.g., braking distance, weather conditions, such as fog, mist, rain or snow, road conditions, such as wet or icy, and light conditions, such as day or night.

Further the term "in front of" is related to a moving direction of the vehicle. Thus if the vehicle moves in its normal driving direction, the region in front of the vehicle is located geometrically in front of the vehicle. However, if reversing the vehicle, i.e., going backwards, the region in front of the vehicle in relation to its moving direction will refer to a region located geometrically behind the vehicle. Moreover, if the vehicle turns, the region in front of the vehicle may relate to a region being, at least partly, to the left, or to the right of the vehicle.

A free path is provided when it is determined that there is not any object present in the selectable region, for which object it would be appropriate, in some cases, to activate a protection means of the vehicle, in case the vehicle would impact with the object and/or just before an impact with the object would occur. The appropriateness may e.g., depend on the relative speed between the vehicle hosting the safety system and the object.

Further, a free path is provided although the remote sensor may have detected one or more objects, for which it would not be appropriate to activate a protection means of the vehicle, in case the vehicle would impact with the object and/or just before an impact with the object would occur, e.g., since these objects are of a type not motivating an activation of a protection means, e.g., being too small and/or light-weight.

The method may comprise utilizing a default sensitivity of the impact sensor, such that the lowering of the sensitivity is made in relation to the default sensitivity. The sensitivity of the impact sensor is then lowered in relation to a default value. The default value may be a fixed value or a selectable value, e.g., based on the road type and/or speed of the vehicle. If more than one impact sensor is used, they may have individual default values.

Under normal operation of the safety system, the selectable region in front of the vehicle is continuously or intermittently scanned by means of the at least one remote sensor. It may then be continuously or intermittently determined, if a free path is provided. The scanning may be performed with an interval of 0 to 300 milliseconds, preferably with an interval of 5 to 300 milliseconds, more preferably with an interval of 20 to 200 milliseconds and most preferably with an interval of 30 to 100 milliseconds.

The method may comprise
detecting an object in the selectable region in front of the vehicle,
classifying the object into one of at least two object categories, namely a "Fire Object" or "not a Fire Object",
determining that the selectable region provides a free path for the vehicle based on information from the remote sensor, when there is no "Fire Object" present in the selectable region.

A "Fire Object" is an object for which it, in some cases, would be appropriate to activate a protection means of the vehicle, in case the vehicle would impact with the object and/or just before an impact with the object would occur. The appropriateness may e.g., depend on the relative speed between the vehicle hosting the safety system and the object.

The object classification may depend on type of protection means. For example, for a supplementary restraint system, an object like another vehicle, a wall and/or a pole is an object for which it would be appropriate to activate the protection means, i.e., a "Fire Object". For a vulnerable road user protection system, a pedestrian or a cyclist would be a "Fire Object". If there is a "Fire Object" in the selectable region in front of the vehicle, there is no free path. There is only a free path, if there is no "Fire Object" present in the selectable region.

In addition, or as an alternative, the method may comprise
classifying the object into one of at least three object categories, namely a "Fire Object", a "No-Fire Object" or an "Other Object",
determining that the selectable region provides a free path for the vehicle based on information from the remote sensor, when there is no "Fire Object" present in the selectable region and 0-n "No-Fire objects" present in the selectable region, n being a positive integer.

The "Fire Object" is defined as above. A "No-Fire Object" is an object for which it would not be appropriate to activate a protection means of the vehicle, in case the vehicle would impact with the object and/or just before an impact with the object would occur, e.g., since these objects do not motivate the activation of a protection means. Examples of a "No-Fire Object" is a pot hole, a curb/pavement edge and/or a small animal, such as a cat, dog, bird, rabbit, rat or mouse. Similarly as for the "Fire Object", the object classification "No-Fire Object" may depend on type of protection means. Therefore, a pedestrian may be a "Fire Object" for a vulnerable road user protection system and a "No-Fire Object" for a supplementary restraint system.

It is acceptable to have one, two, three or more, up to n "No-Fire Objects", when determining that the selectable region provides a free path for the vehicle, as long as there is no "Fire Object", wherein n is a positive integer.

As mentioned above, the sensitivity of the impact sensor is temporarily lowered, such that the lower sensitivity may be utilized within the region, wherein it has been determined that the free path is provided.

If no free path is determined, the default value may be used for the sensitivity of the impact sensor. If the object in the selectable region neither is classified as a "Fire Object", nor a "No-Fire Object", it may be classified as an "Other Object". The "Other Object" object category may also be utilized for objects which are difficult to classify. If one or more "Other Objects" are determined in the selectable region, the default sensitivity of the impact sensor can be used. As already mentioned above, the object classification may depend on type of protection means.

The method may comprise determining the speed of the object relative to the vehicle as an additional optional input for classifying the object. The remote sensor may be used to determine the speed of the object relative to the vehicle. It is for example known that a pedestrian or a cyclist normally moves slower than another vehicle. On the other hand, an object such as a dust bin or a traffic sign normally stands still. If knowing the speed of the vehicle, an absolute speed of the object may be determined using the relative speed.

The method may comprise the step of
determining a height or a depth of the object by means of information from the remote sensor.

The information about height or depth may be utilized as an additional optional input for the classifying of the object. For example, the height of a moving human being is statistically known and differentiates a human being from e.g., a cat or a dog. Further, if the height of the object is low, e.g., lower than a bonnet of the vehicle, there may be no use activating a certain protection means being at the height of the bonnet or higher, such as an airbag covering the windscreen and/or A-pillars. In addition, if the depth of e.g., a pot-hole is low, there may be no motivation to activate a protection means.

The method as described above may be utilized when the protection system comprises an irreversible protection means. In such a case, it could be advantageous not to activate one or more of the irreversible protection means, since it/they would have to be replaced or repaired after activation, e.g., at a workshop, and it/they anyway would not have contributed to an adequate protection. Thereby, repair and replacement of protection means and/or a stand-still of the vehicle may be avoided, things that may lead to vehicle user dissatisfaction.

As an alternative, or as a complement, the method may be performed when the protection system comprises a reversible protection means. Even if a reversible protection means may be easily reset, it may have a maximum number of resets and/or it may cost some time and effort to reset it. This may be avoided, if not activating a reversible protection means, if it will not help to mitigate the consequence of the collision.

The method may comprise
determining a window being defined by a time and/or a distance from a present location of the vehicle,
utilizing the lowered sensitivity of the impact sensor, when the vehicle is within the window.

The size and/or shape of the window may be based on knowledge about the selectable region, the speed and direction of the vehicle, and/or speed and direction of other objects, which may potentially intersect with the vehicle. Preferably, the window is located at least partly within the selectable region, more preferably substantially within the selectable region, and most preferably completely within the selectable region. The window may be as large as the selectable region or it may be smaller. When the vehicle is within the window, the sensitivity is temporarily lowered. Outside the window, the default value may be used.

The window may be updated every time the selectable region is scanned. As mentioned above, the scanning may be performed with an interval of 0 to 300 milliseconds, preferably with an interval of 5 to 300 milliseconds, more preferably with an interval of 20 to 200 milliseconds and most preferably with an interval of 30 to 100 milliseconds.

If more than one object is detected in the selectable region, there may be an individual window determined for one or more of the individual objects.

The method may comprise
lowering the sensitivity of the impact sensor by adjusting a selectable fire interval of an evaluation algorithm
the impact sensor sending information about an impact or an imminent impact as a signal to the evaluation algorithm, and
the evaluation algorithm evaluating if the signal is within the selectable fire interval, and in that case activating the protection system.

The impact sensor may be adapted to feed an evaluation algorithm, e.g., being run in a processor, with a signal. The evaluation algorithm may consider the signal as a raw data, e.g., measured acceleration, an integral of the raw data, e.g., speed, and/or as a double integral of the raw data, e.g., distance. The evaluation algorithm may have a selectable fire interval, which fire interval may be selected using data from the classifier regarding the object category as input. If the signal is within the fire interval, a protection means may be activated. Different protection means may have different fire intervals.

If the selectable fire interval of the evaluation algorithm comprises a lower threshold, which is to be exceeded in order to activate the protection means, a determined free path would correspond to a high fire threshold, i.e., a determined free path would correspond to a low sensitivity of the impact sensor, thereby avoiding that a protection means is activated undesirably, i.e., when it will not contribute to mitigate the consequences of a collision.

In a second aspect of the present disclosure, there is provided a safety system of a vehicle. The safety system comprises:
a remote sensor, for scanning a selectable region in front of the vehicle,
an impact sensor, for detecting an impact or an imminent impact with the vehicle,
a protection system adapted to be activated by the impact sensor,
a determination unit for determining that the selectable region provides a free path for the vehicle based on information from the remote sensor, and
an adjustment unit, which is adapted to lower a sensitivity of the impact sensor, if determining that the selectable region provides a free path for the vehicle.

The remote sensor may comprise a radar system, a lidar system, an ultrasonic system, a camera system, a stereo camera system and/or an IR camera, for example. The remote sensor is adapted to send information to the determination unit also comprised in the safety system, which determination unit is adapted for determining that the selectable region provides a free path for the vehicle based on information from the remote sensor. If more than one remote sensor is used, there may be more than one determination unit, e.g., each remote sensor having a corresponding determination unit. However, it is in that case preferred to have a determination unit, which is adapted to receive input from more than one remote sensor. Preferably one determination unit is adapted to receive input from all the remote sensors.

The impact sensor is adapted to activate the protection system, when the impact sensor detects an impact and/or an imminent impact. It may comprise one or more accelerometers at different locations in the vehicle, a pressure sensor, a light sensor, a fiber-optic sensor, a contact foil and/or a piezoelectric sensor, for example. The impact sensor is adapted to detect an object being in contact with and/or in a close proximity of the impact sensor. There may be a plurality of impact sensors at different locations in the vehicle.

The safety system may further comprise a classifier adapted for classifying an object detected in the selectable region into one of at least two object categories, namely a "Fire Object" or "not a Fire Object", preferably into one of at least three object categories, namely a "Fire Object", a "No-Fire Object" or an "Other Object". The different object categories are explained above.

The determination unit may comprise an image analysis system, which is used for determining that the selectable region provides a free path for the vehicle.

The safety system may optionally comprise means for determining the speed of the object and/or the speed of the vehicle. The speed of the object relative to the vehicle may be utilized as an additional, optional, input for classifying the object. The remote sensor may be used to determine the speed of the object relative to the vehicle. It is for example known that a pedestrian or a cyclist normally moves slower than another vehicle. On the other hand, objects such as a dust bin or a traffic sign normally stands still. If knowing the speed of the vehicle, an absolute speed of the object may be determined.

In order for the vehicle to be able to communicate with other vehicles and/or an infrastructure, the safety system can optionally comprise a communication unit, e.g., a transceiver. Data may be sent to the vehicle regarding position of the vehicle and/or information of the road lying ahead of the vehicle. Other vehicles being adjacent to the vehicle hosting the safety system may communicate data about their positions, directions and speed.

In a third aspect of the present disclosure, there is provided a vehicle comprising the safety system described above.

BRIEF DESCRIPTION OF THE DRAWINGS

The present disclosure will hereinafter be further explained by means of non-limiting examples with reference to the appended drawings wherein.

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the disclosure and not to limit the scope of the disclosure. Therefore, specific structural and functional details disclosed herein are not to be interpreted as limiting, but merely as a representative basis for teaching one skilled in the art. Furthermore, details from two or more of the embodiments may be combined with each other.

Figure 1:
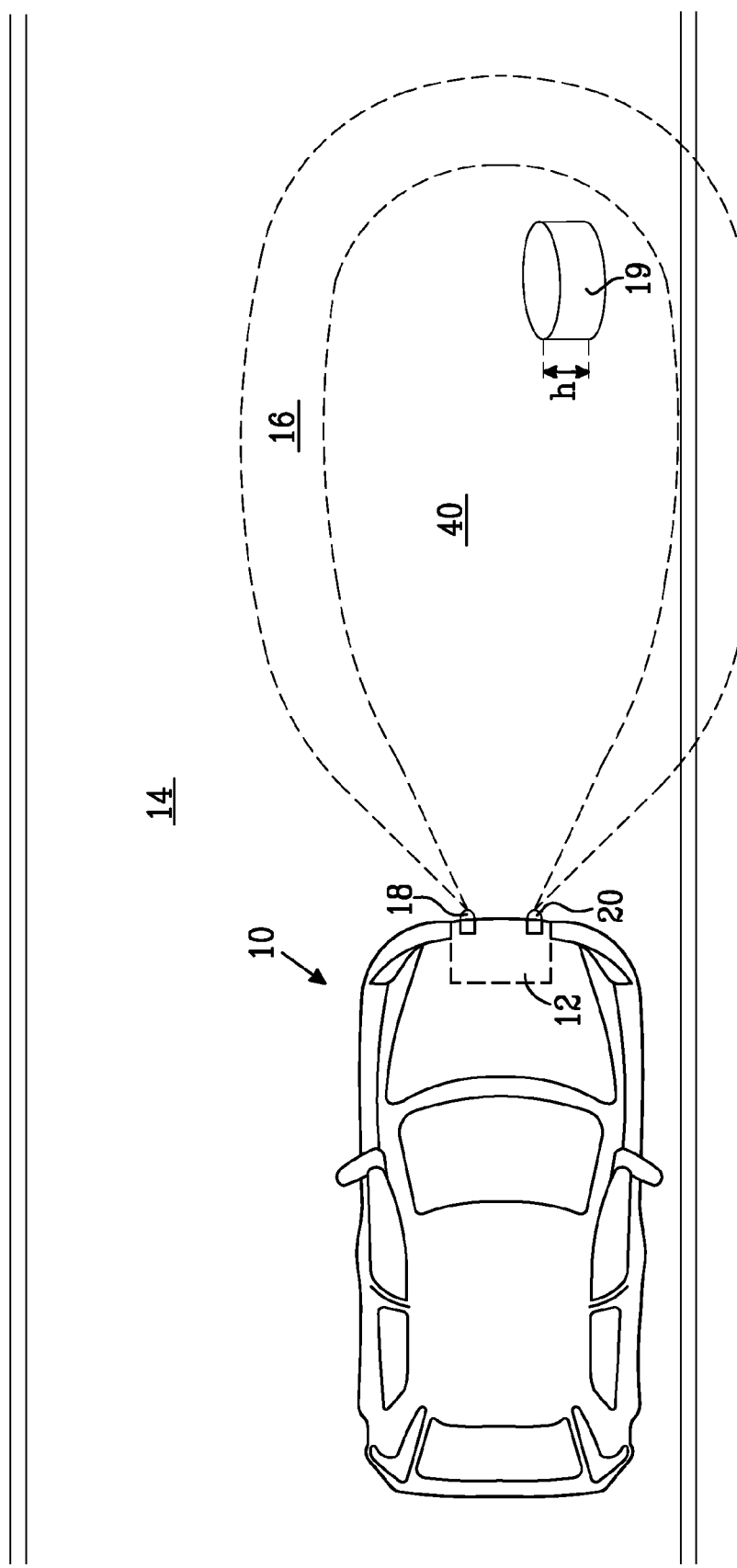
FIG. 1 illustrates a vehicle comprising a safety system according to the disclosure.

FIG. 1 schematically illustrates a vehicle 10 comprising a safety system 12 according to the disclosure. The vehicle 10 travels on a road 14. The safety system 12 is adapted to determine if a free path is provided in a selectable region 16 in front of the vehicle 10. The selectable region 16 is scanned by means of at least one remote sensor 18. If it is determined that the selectable region 16 provides a free path, a sensitivity of at least one impact sensor 20 is lowered.

The size and/or shape of the selectable region 16 may be selected considering factors such as a speed of the vehicle 10 hosting the safety system 12, capability of the vehicle 10, e.g., braking distance, weather conditions, such as fog, mist, rain or snow, road conditions, such as wet or icy, and light conditions, such as day or night.

A free path is provided when it is determined that there is not any object 19 present in the selectable region 16, for which object 19 it would be appropriate to activate a protection means 30 of the vehicle 10, in case the vehicle 10 would impact with the object 19 and/or just before an impact with the object 19 would occur. However, the remote sensor 18 may have detected one or more objects, for which it would not be appropriate to activate a protection means 30 of the vehicle 10, in case the vehicle 10 would impact with the object 19 and/or just before an impact with the object 19 would occur, e.g., since these objects are of a type not motivating an activation of a protection means, e.g., being too small and/or light-weight.

Figure 2:
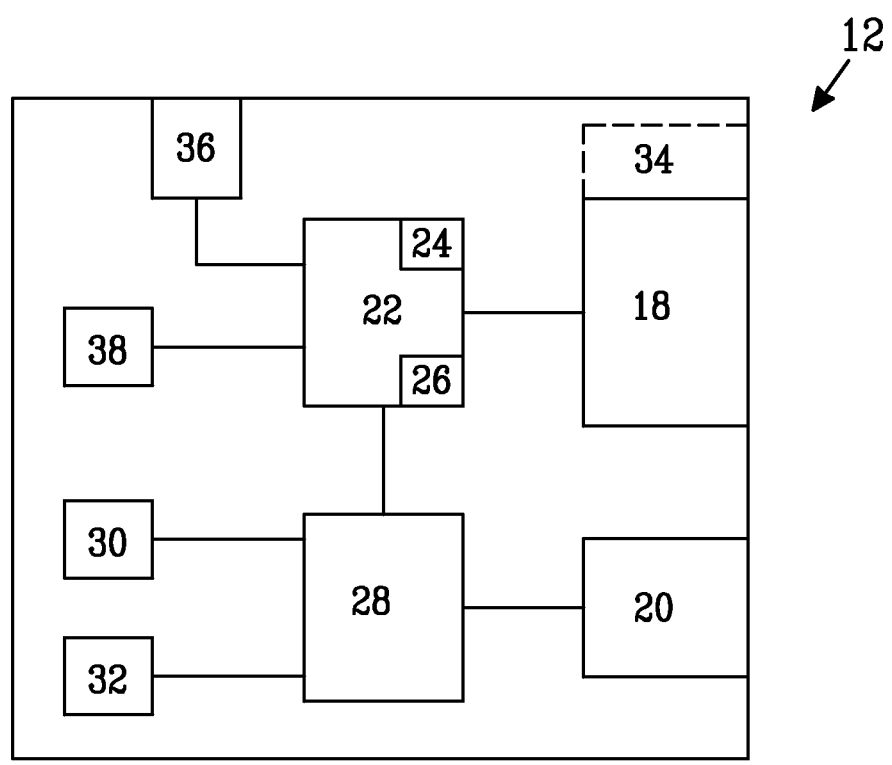
FIG. 2 illustrates the safety system of FIG. 1.

FIG. 2 schematically illustrates various components of the safety system 12. The above-mentioned at least one remote sensor 18 and the at least one impact sensor 20 are comprised in the safety system 12. The safety system 12 further includes a protection system comprising at least one protection means 30.

The remote sensor 18 may comprise a radar system, a lidar system, an ultrasonic system, a camera system, a stereo camera system and/or an IR camera system, for example. The remote sensor 18 is adapted to send information to a determination unit 22 also comprised in the safety system 12, which determination unit 22 is adapted for determining that the selectable region 16 provides a free path for the vehicle 10 based on information from the remote sensor 18. If more than one remote sensor 18 is used, there may be more than one determination unit 22, e.g., each remote sensor 18 having a corresponding determination unit 22. However, it is in that case preferred to have a determination unit 22, which is adapted to receive input from more than one remote sensor 18. Preferably one determination unit 22 is adapted to receive input from all the remote sensors 18.

The impact sensor 20 is used for detecting an impact or imminent impact with the vehicle 10. The impact sensor 20 may comprise one or more accelerometers at different locations in the vehicle 10, a pressure sensor, a light sensor, a fiber-optic sensor, a contact foil and/or a piezoelectric sensor, for example. The impact sensor 20 is adapted to detect an object being in contact with and/or in a close proximity of the impact sensor 20. There may be a plurality of impact sensors 20 at different locations in the vehicle 10, even if only one is shown in FIGS. 1 and 2.

The determination unit 22 optionally comprises an image analysis system 24. Further, the determination unit 22 optionally comprises a classifier 26 being used for classifying the target object into an object category. The classifier 26 may use the image analysis system 24 for the object classification, which is further described below.

The safety system 12 further comprises at least one adjustment unit 28 and one or more protection means 30. The adjustment unit 28 is adapted to lower the sensitivity of the at least one impact sensor 20, if the determination unit 22 determines that the selectable region 16 provides a free path for the vehicle 10. The sensitivity of the impact sensor 20 may be lowered in relation to a default value. If more than one impact sensor 20 is used, they may have individual default values. Further, the default value may be selectable, e.g., based on the road type and/or speed of the vehicle 10. If more than one impact sensor 20 is used, there may be more than one adjustment unit 28, e.g., each impact sensor 20 having a corresponding adjustment unit 28. Alternatively, or as a complement, one adjustment unit 28 may be utilized for adjusting the sensitivity of two three or more impact sensors 20.

As one skilled in the art would understand, each determination unit 22 and adjustment unit 28 may comprise, for example, an appropriately programmed processor, which may comprise a memory and stored computer executable instructions for performing various operations and/or functions, such as those described herein.

The protection means 30 may be preventive and/or protective. They may be internal and/or external. They may be reversible and/or irreversible. They may be part of a supplementary restraint system, i.e., intended to protect users of the vehicle, and/or may be part of a vulnerable road user protection system. Examples of protection means of a supplementary restraint system are a reversible belt-tensioner, an irreversible belt tensioner, an adaptive force limitation means, a driver airbag, a passenger airbag, an adaptive steering column, a side airbag, an inflatable curtain and/or a knee airbag. Examples of a protection means of a vulnerable road user protection system include a pedestrian airbag and/or a deployable bonnet.

The different components of the safety system 12 may form separate physical units. Alternatively, or as a complement, one or more of them may form a common physical unit. Purely as an example, the determination unit 22 and the adjustment unit 28 may be combined in one physical unit, e.g., together with a processor 32. The determination unit 22 and/or the adjustment unit 28 may be comprised in the processor 32.

One of the object categories utilized in the object classification is that the object 19 is classified as a "Fire Object". A "Fire Object" is an object for which it, in some cases, would be appropriate to activate a protection means 30 of the vehicle 10, in case the vehicle 10 would impact with the object 19 and/or just before an impact with the object 19 would occur. The appropriateness may e.g., depend on the relative speed between the vehicle 10 hosting the safety system 12 and the object 19.

The object classification may depend on type of protection means. For example, for a supplementary restraint system, an object like another vehicle, a wall, and/or a pole is an object for which it would be appropriate to activate the protection means, i.e., a "Fire Object". For a vulnerable road user protection system, a pedestrian or a cyclist would be a "Fire Object". If there is a "Fire Object" in the selectable region 16 in front of the vehicle 12, there is no free path.

Another object category utilized in the object classification is that the object 19 is a "No-Fire Object". A "No-Fire Object" is an object for which it would not be appropriate to activate a protection means 30 of the vehicle 10, in case the vehicle 10 would impact with the object 19 and/or just before an impact with the object 19 would occur, e.g., since these objects do not motivate the activation of a protection means 30. Examples of a "No-Fire Object" is a pot hole, a curb/pavement edge and/or a small animal, such as a cat, dog, bird, rabbit, rat or mouse. Similarly as exemplified above for the "Fire Object", the object classification "No-Fire Object" may depend on type of protection means.

It is acceptable to have one, two, three or more "No-Fire Objects", when determining that the selectable region 16 provides a free path for the vehicle 10, as long as there is no "Fire Object".

As mentioned above, when it has been determined that the selectable region 16 provides a free path for the vehicle 10, the sensitivity of the impact sensor 20 is temporarily lowered.

If no free path is detected, the default value may be used for the sensitivity of the impact sensor 20. If the object 19 in the selectable region 16 neither is classified as a "Fire Object", nor a "No-Fire Object", it may be classified as an "Other Object". The "Other Object" object category may also be utilized for objects which are difficult to classify. If one or more "Other Objects" are determined in the selectable region 16, the default sensitivity of the impact sensor 20 can be used. As already mentioned above, the object classification may depend on type of protection means.

In the illustrated embodiment, the impact sensor 20 is adapted to feed an evaluation algorithm with information. The evaluation algorithm may consider the information as a raw data, e.g., measured acceleration, an integral of the raw data, e.g., speed, and/or as a double integral of the raw data, e.g., distance.

The evaluation algorithm is processed in the processor 32. The evaluation algorithm has a selectable fire interval, which fire interval is selected using data from the classifier 26 regarding the object category as input. If the signal is within the fire interval, a protection means will be activated. Different protection means 30 may have different fire intervals.

If the selectable fire interval comprises a lower threshold, which is to be exceeded in order to activate the protection means 30, a determined free path would correspond to a high fire threshold, i.e., a determined free path would correspond to a low sensitivity of the impact sensor, thereby avoiding that a protection means is activated unnecessarily, i.e., when it will not contribute to mitigate the consequences of a collision.

In the illustrated embodiment, the safety system additionally comprises means 34 to determine the speed of an object 19, in case there is one or more objects 19 in the selectable region 16, e.g., in relation to the vehicle 10. This means 34 may be comprised in the remote sensor 18. The speed information may be used as complementary input for the classification of the object 19. It is for example known that a pedestrian or a cyclist normally moves slower than another vehicle. On the other hand, objects such as a dust bin or a traffic sign normally stands still.

In order for the vehicle 10 to be able to communicate with other vehicles and/or an infrastructure unit, the safety system 12 can optionally comprise a communication unit 36, e.g., a transceiver. Data may be sent to the vehicle regarding position of the vehicle 10 and/or information of the road 14 lying ahead of the vehicle 10. Other vehicles being adjacent to the vehicle 10 hosting the safety system may communicate data about their positions, directions and speed. The safety system 12 of the vehicle 10 may also comprise means 38 for determining the speed of the vehicle 10 itself, such as a vehicle speedometer or speed sensor. Knowing the speed of the vehicle 10, may help to determine the speed of the object 19.

The information from the remote sensor 18, and/or the means 34 to determine the speed of the object 19, may be used to determine an impact point on the vehicle 10. The determined impact point may be used for selection of a subset of impact sensors 20 from a plurality of impact sensors 20 comprised in different locations in the vehicle 10. Information from impact sensors 20 not belonging to the subset may be treated with less weight. The choice of which protection means 30 to activate may be selected based on the information about the determined impact point.

Under normal operation of the safety system 12, the selectable region 16 in front of the vehicle 10 is continuously or intermittently scanned by means of the at least one remote sensor 18 in order to detect one or more possible objects 19. The scanning may be performed with an interval of 0 to 300 milliseconds, preferably with an interval of 5 to 300 milliseconds, more preferably with an interval of 20 to 200 milliseconds and most preferably with an interval of 30 to 100 milliseconds. It is then continuously or intermittently determined if a free path is provided. Further, the impact sensor 20 is operable, such that it is able to detect if an impact occurs or is imminent to occur.

The information from the remote sensor 18 may be used to determine a height h or a depth of the possible object 19 being in the selectable region 16. The height h or depth is usable as an additional complementary optional input for the object classification, as well as being used as input for the evaluation algorithm. For example, the height of moving human being is statistically known and differentiates a human being from e.g., a cat or a dog. Further, if the height h of the object 19 is low, e.g., lower than a bonnet of the vehicle, there may be no use activating a certain protection means being at the height of the bonnet or higher, such as an airbag covering the windscreen and/or A-pillars.

The lowered sensitivity of the impact sensor 20 may be used in a window 40 defined by a time and/or distance from a present location of the vehicle 10. The size and/or shape of the window 40 may be based on knowledge about the selectable region 16, the speed and direction of the vehicle 12, and/or speed and direction of other objects, which may potentially intersect with the vehicle 12. Outside the window 40, the default value may be used. Preferably, the window 40 is located at least partly within the selectable region 16, more preferably substantially within, and most preferably completely within. The window 40 may be as large as the selectable region 16 or it may be smaller, as is illustrated in FIG. 1. The window 40 may be updated every time the selectable region 16 is scanned. If more than one object 19 is detected in the selectable region 16, there may be an individual window determined for one or more of the individual objects.

Figure 3:
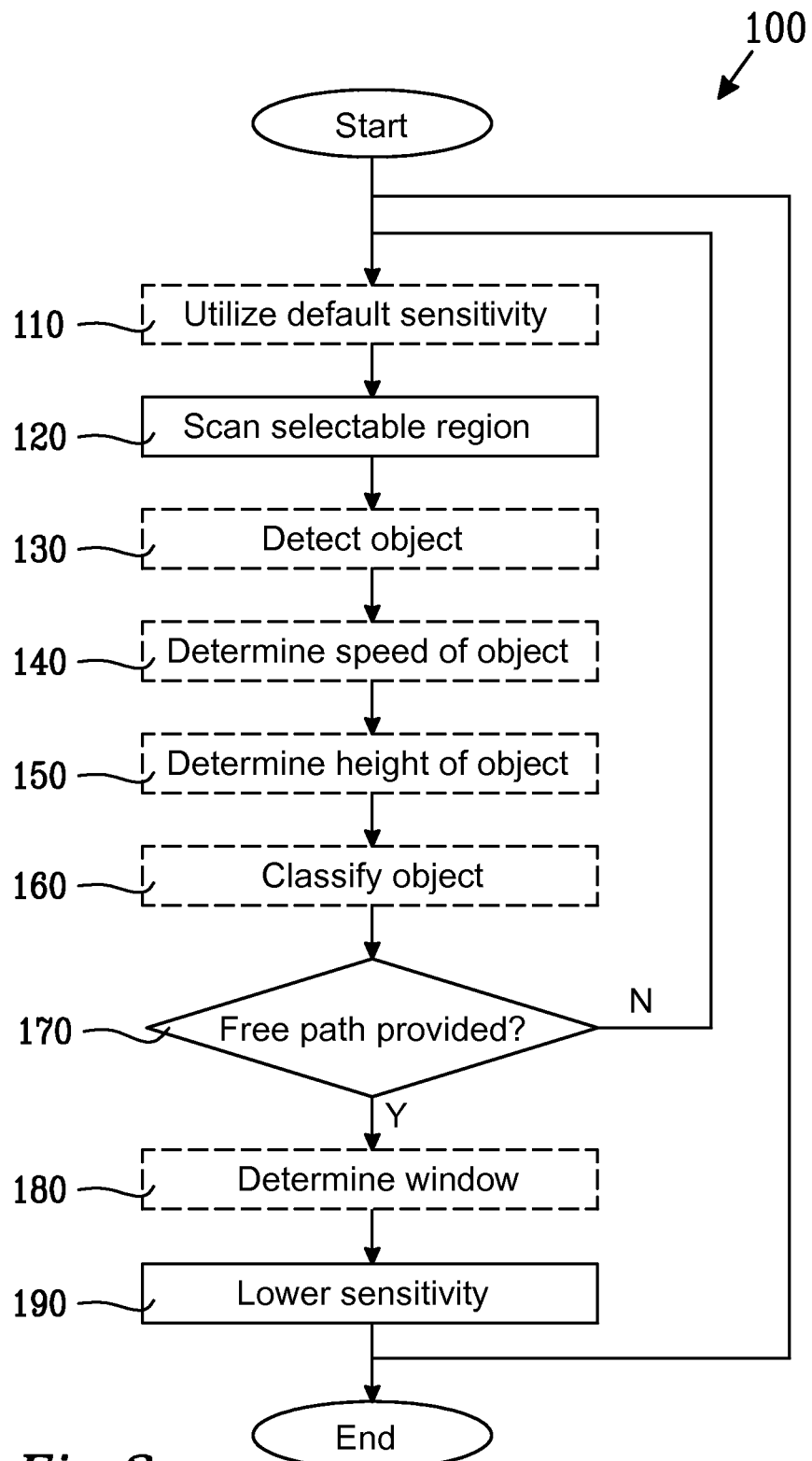
FIG. 3 is a flowchart of a method according to the disclosure.

FIG. 3 is a flow chart of a method 100 according to the disclosure. Optional steps are surrounded by a dashed contour line.

In its simplest form, the method comprises:
Step 120: Scanning a selectable region 16 in front of the vehicle 10 by means of the remote sensor 18,
Step 170: Determining if the selectable region 16 provides a free path for the vehicle 10 based on information from the remote sensor 18, and in that case performing
Step 190: Lowering a sensitivity of the impact sensor 20.

The method may be performed with an interval of 0 to 300 milliseconds, preferably with an interval of 5 to 300 milliseconds, more preferably with an interval of 20 to 200 milliseconds and most preferably with an interval of 30 to 100 milliseconds.

There may also be an optional step:
Step 110: Utilizing a default sensitivity of the impact sensor, such that the lowering of the sensitivity is made in relation to the default sensitivity.

One option within the scope of the proposed method is to utilize object classification when determining if the selectable region 16 provides a free path for the vehicle 10.

The method may then comprise
130: Detecting an object 19 in the selectable region 16 in front of the vehicle 10,
160: Classifying the object 19 into an object category.

The object categories may be at least two: "Fire Object" or "not a Fire Object", and preferably at least three, namely a "Fire Object", a "No-Fire Object" or an "Other Object". The object categories are further explained above. In step 170, the determining if the selectable region 16 provides a free path for the vehicle 10 based on information from the remote sensor 18, includes checking that there is no "Fire Object" present in the selectable region 16. However, it is acceptable to have one, two, three or more, up to n "No-Fire Objects", n being a positive integer, when determining that the selectable region 16 provides a free path for the vehicle 10, as long as there is no "Fire Object".

The classification of step 170 may be performed by means of image analysis. Further, additional input for the object classification may be obtained from performing the steps of 140: Determining the speed of the object 19, e.g., relative to the vehicle 10, and/or
150: Determining a height h, or a depth, of the object 19.

Both step 140 and step 150 may be performed by means of the remote sensor 18.

The method may also comprise
180: Determining a window being defined by a time and/or a distance from a present location of the vehicle 10.

The lowered sensitivity of the impact sensor may be utilized, when the vehicle is within the window and otherwise the default sensitivity may be utilized.

The method may be adapted to include one or more of the features as described above.

Further modifications of the disclosure within the scope of the appended claims are feasible. As such, the present disclosure should not be considered as limited by the embodiments and figures described herein. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a safety system of a vehicle, wherein the safety system includes a remote sensor, an impact sensor and a protection system, the protection system adapted to be activated by the impact sensor, the method comprising:
   scanning a selectable region of a road in front of the vehicle by the remote sensor;
   detecting an object distinct from the road in the selectable region in front of the vehicle;
   providing at least three objects categories, namely, a "Fire Object", a "No-Fire Object", and an "Other Object", and classifying each object detected distinct from the road into one of the at least three object categories;
   determining that the selectable region provides a free path for the vehicle based on information from the remote sensor, when there is no "Fire Object" present in the selectable region and 0-n "No-Fire Object(s)" present in the selectable region, n being a positive integer;
   lowering a sensitivity of the impact sensor in response to determining that the selectable region provides a free path for the vehicle; and
   controlling activation of the protection system based on the lowered sensitivity of the impact sensor.

2. The method according to claim 1 further comprising:
   utilizing a default sensitivity of the impact sensor, such that the lowering of the sensitivity is made in relation to the default sensitivity.

3. The method according to claim 2 further comprising:
   using the default sensitivity if one or more "Other Object (s)" is determined in the selectable region.

4. The method according to claim 3 further comprising determining a height or a depth of the object based on information from the remote sensor, wherein classifying the object is based on the determined height or depth.

5. The method according to claim 2 further comprising:
   determining a height or a depth of the object based on information from the remote sensor, wherein classifying the object is based on the determined height or depth.

6. The method according to claim 2 further comprising determining speed of the object relative to the vehicle as input for classifying the object.

7. The method according to claim 6 further comprising determining a height or a depth of the object based on information from the remote sensor, wherein classifying the object is also based on the determined height or depth.

8. The method according to claim 1 further comprising determining speed of the object relative to the vehicle as input for classifying the object.

9. The method according to claim 1 further comprising determining a height or a depth of the object based on information from the remote sensor, wherein classifying the object is based on the determined height or depth.

10. The method according to claim 1 wherein the protection system comprises an irreversible protection means.

11. The method according to claim 1 further comprising:
determining a window being defined by a time and/or a distance from a present location of the vehicle; and
utilizing the lowered sensitivity of the impact sensor for controlling activation of the protection system when the vehicle is within the window.

12. The method according to claim 1 wherein lowering the sensitivity of the impact sensor includes lowering the sensitivity by adjusting a selectable fire interval of an evaluation algorithm, and wherein the method further comprises:
the impact sensor sending information about an impact or an imminent impact as a signal to the evaluation algorithm, and
evaluating, by the evaluation algorithm, if the signal is within the selectable fire interval, and in that case activating the protection system.

13. A safety system of a vehicle, the safety system comprising:
a remote sensor for scanning a selectable region of a road in front of the vehicle;
an impact sensor for detecting an impact or an imminent impact with the vehicle and for activating a protection system;
a determination unit for determining whether the selectable region provides a free path for the vehicle based on information from the remote sensor; and
an adjustment unit adapted to lower a sensitivity of the impact sensor if determined that the selectable region provides a free path for the vehicle;
a classifier adapted for providing at least three objects categories, namely, a "Fire Object", a "No-Fire Object", and an "Other Object", and classifying each object detected distinct from the road in the selectable region into one of the at least three object categories;
wherein the determination unit is adapted to determine that the selectable region provides the free path for the vehicle based on information from the remote sensor, when there is no "Fire Object" present in the selectable region and 0-n "No-Fire Object(s)" present in the selectable region, n being a positive integer.

14. The safety system according to claim 13 wherein the impact sensor has a default sensitivity, such that the lowering of the sensitivity is made in relation to the default sensitivity.

15. The safety system according to claim 14 wherein the default sensitivity is used if one or more "Other Object(s)" is determined in the selectable region.

16. The safety system according to claim 13 wherein the remote sensor comprises a radar system, a lidar system, an ultrasonic system, a camera system, a stereo camera system and/or an IR camera.

17. The safety system according to claim 13 wherein the impact sensor comprises an accelerometer, a pressure sensor, a light sensor, a fiber-optic sensor, a contact foil and/or a piezoelectric sensor.

18. The safety system according to claim 13 further comprising means for determining speed of the object and/or of the vehicle.

19. A vehicle comprising the safety system according to claim 13.

* * * * *

UNITED STATES PATENT AND TRADEMARK OFFICE
CERTIFICATE OF CORRECTION

PATENT NO.       : 9,802,565 B2
APPLICATION NO.  : 14/559468
DATED            : October 31, 2017
INVENTOR(S)      : Par Nilsson et al.

It is certified that error appears in the above-identified patent and that said Letters Patent is hereby corrected as shown below:

In the Claims

Column 12, Line 35, Claim 1:
After "providing at least three"
Delete "objects" and
Insert -- object --.

Column 14, Line 7, Claim 13:
After "providing at least three"
Delete "objects" and
Insert -- object --.

Signed and Sealed this
Thirteenth Day of February, 2018

Andrei Iancu
*Director of the United States Patent and Trademark Office*